US009373446B2

(12) United States Patent
Park et al.

(10) Patent No.: US 9,373,446 B2
(45) Date of Patent: Jun. 21, 2016

(54) MULTILAYER CERAMIC ELECTRONIC PART, BOARD HAVING THE SAME MOUNTED THEREON, AND MANUFACTURING METHOD THEREOF

(71) Applicant: SAMSUNG ELECTRO-MECHANICS CO., LTD., Suwon-Si, Gyeonggi-Do (KR)

(72) Inventors: Sang Soo Park, Suwon-Si (KR); Young Ghyu Ahn, Suwon-Si (KR); Doo Young Kim, Suwon-Si (KR)

(73) Assignee: SAMSUNG ELECTRO-MECHANICS CO., LTD., Suwon-Si, Gyeonggi-Do ( * ) Notice: Subject to any disclaimer, the term of this patent is extended or adjusted under 35 U.S.C. 154(b) by 112 days.

(21) Appl. No.: 14/268,922

(22) Filed: May 2, 2014

(65) Prior Publication Data
US 2015/0043125 A1 Feb. 12, 2015

(30) Foreign Application Priority Data
Aug. 9, 2013 (KR) ........................ 10-2013-0094838

(51) Int. Cl.
H01G 4/30 (2006.01)
H01G 4/12 (2006.01)
H01G 2/06 (2006.01)
H01G 4/232 (2006.01)

(52) U.S. Cl.
CPC . *H01G 4/30* (2013.01); *H01G 2/06* (2013.01); *H01G 4/12* (2013.01); *H01G 4/232* (2013.01)

(58) Field of Classification Search
CPC ........................................................ H01G 4/30
USPC .......... 361/301.4, 301.2, 306.1, 306.3, 321.1, 361/321.2, 303–305
See application file for complete search history.

(56) References Cited

U.S. PATENT DOCUMENTS

| 8,934,215 | B2 * | 1/2015 | Cho | H01G 4/30 361/301.1 |
| 2007/0215379 | A1 | 9/2007 | Komatsu et al. | |
| 2014/0124251 | A1 * | 5/2014 | Park | H05K 3/3442 174/257 |

FOREIGN PATENT DOCUMENTS

JP 2009088319 A * 4/2009
KR 10-2007-0089629 A 8/2007

* cited by examiner

*Primary Examiner* — Nguyen T Ha
(74) *Attorney, Agent, or Firm* — McDermott Will & Emery LLP

(57) ABSTRACT

A multilayer ceramic electronic part may include: a ceramic body; an active layer including a plurality of first and second internal electrodes disposed to be alternately exposed to both end surfaces of the ceramic body, having the dielectric layer therebetween; an upper cover layer formed on an upper portion of the active layer; a lower cover layer formed on a lower portion of the active layer and having a thickness thicker than that of the upper cover layer; and first and second external electrodes electrically connected to the first and second internal electrodes, wherein the first and second external electrodes include: first and second conductive layers extended from both end surfaces of the ceramic body onto upper and lower main surfaces thereof; and first and second insulation layers formed on the first and second conductive layers disposed on both end surfaces of the ceramic body.

21 Claims, 4 Drawing Sheets

MULTILAYER CERAMIC ELECTRONIC PART, BOARD HAVING THE SAME MOUNTED THEREON, AND MANUFACTURING METHOD THEREOF

CROSS-REFERENCE TO RELATED APPLICATION

This application claims the benefit of Korean Patent Application No. 10-2013-0094838 filed on Aug. 9, 2013, with the Korean Intellectual Property Office, the disclosure of which is incorporated herein by reference.

BACKGROUND

The present disclosure relates to a multilayer ceramic electronic part, a board having the same mounted thereon, and a manufacturing method thereof.

In accordance with the recent trend toward miniaturization of electronic products, small size and high capacitance multilayer ceramic electronic parts have been used therein.

Therefore, efforts have been attempted using various methods to allow dielectric layers and internal electrodes to be thinned and stacked in increasingly greater numbers. Recently, a multilayer ceramic electronic component has been manufactured in which a thickness of the dielectric layers is relatively low and the number of stacked layers is increased.

Since such a dielectric layer has piezoelectricity and electrostriction, when a direct current (DC) or alternating current (AC) voltage is applied to the multilayer ceramic electronic part, a piezoelectric phenomenon occurs between the internal electrodes, causing the occurrence of vibrations.

The vibrations are transferred to a printed circuit board on which the multilayer ceramic electronic part is mounted through an external electrode of the multilayer ceramic electronic part and a solder, such that the entire printed circuit board acts as a sound reflective surface to generate vibration sound, noise.

The vibration sound may have a frequency corresponding to an audio frequency in a region of 20 to 20,000 Hz causing listeners discomfort. The vibration sound causing listeners discomfort is called acoustic noise.

Recently, since acoustic noise generated in multilayer ceramic electronic parts may be further prominent due to low noise designs of recent electronic devices, research into technology for effectively decreasing acoustic noise generated in multilayer ceramic electronic parts has been required.

SUMMARY

Some embodiments of the present disclosure may provide a multilayer ceramic electronic part capable of efficiently decreasing acoustic noise generated due to vibrations generated by a piezoelectric phenomenon and transferred to a printed circuit board through an external electrode and a solder.

According to some embodiments of the present disclosure, a multilayer ceramic electronic part may include: a ceramic body including a plurality of dielectric layers; an active layer including a plurality of first and second internal electrodes formed in the ceramic body and disposed to be alternately exposed to both end surfaces of the ceramic body, having the dielectric layer interposed therebetween; an upper cover layer formed on an upper portion of the active layer; a lower cover layer formed on a lower portion of the active layer and having a thickness greater than that of the upper cover layer; and first and second external electrodes electrically connected to the first and second internal electrodes, wherein the first and second external electrodes include first and second conductive layers extended from both end surfaces of the ceramic body onto upper and lower main surfaces thereof in a cross-section of the ceramic body in a thickness-width direction; and first and second insulation layers formed on the first and second conductive layers disposed on both end surfaces of the ceramic body.

The first and second external electrodes may further include first and second plating layers formed to cover portions of the first and second conductive layers disposed on upper and lower main surfaces of the ceramic body and edges of the first and second insulation layers.

The first and second plating layers may include: a nickel (Ni) plating layer formed to cover portions of the first and second conductive layers disposed on the upper and lower main surfaces of the ceramic body and the edges of the first and second insulation layers; and a tin (Sn) plating layer formed on the nickel plating layer.

The first and second insulation layers may be formed of an epoxy resist.

When a half of the entire thickness of the ceramic body is defined as A, a thickness of the lower cover layer is defined as B, a half of the entire thickness of the active layer is defined as C, and a thickness of the upper cover layer is defined as D, a ratio ((B+C)/A) of deviation of a central portion of the active layer from a central portion of the ceramic body may be in the range of 1.050 to 1.764 ($1.065 \leq (B+C)/A \leq 1.764$).

A ratio (D/B) of a thickness D of the upper cover layer to a thickness B of the lower cover layer may be in a range of 0.021 to 0.545 ($0.021 \leq D/B \leq 0.409$).

A ratio (B/A) of a thickness B of the lower cover layer to a half A of the entire thickness of the ceramic body may be in a range of 0.331 to 1.537 ($0.331 \leq B/A \leq 1.537$).

A ratio (C/B) of a half C of the entire thickness of the active layer to a thickness B of the lower cover layer may be in a range of 0.148 to 2.441 ($0.148 \leq C/B \leq 2.441$).

Points of inflection formed on both end surfaces of the ceramic body may be formed at a height equal to or lower than that of a central portion of the ceramic body in a thickness direction due to a difference between strain generated in the central portion of the active layer and strain generated in the lower cover layer at the time of the application of voltage.

According to some embodiments of the present disclosure, a manufacturing method of a multilayer ceramic electronic part may include: preparing a multilayer body by stacking and pressing a plurality of ceramic sheets on which first and second internal electrodes are formed to face each other, having the ceramic sheet interposed therebetween; preparing a ceramic body by cutting the multilayer body into regions corresponding to respective single capacitors and sintering the cut multilayer body; and forming first and second external electrodes on the ceramic body so as to be electrically connected to the first and second internal electrodes, wherein the forming of the first and second external electrodes includes: forming first and second conductive layers from both end surfaces of the ceramic body to upper and lower main surfaces thereof in a cross-section of the ceramic body in a thickness-width direction using a conductive paste containing copper-glass; and forming first and second insulation layers to cover the first and second conductive layers disposed on both end surfaces of the ceramic body, using an epoxy resist.

The manufacturing method may further include, after the forming of the first and second insulation layers, forming first and second plating layers by plating portions of the first and second conductive layers disposed on the upper and lower main surfaces of the ceramic body and the edges of the first and second insulation layers.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
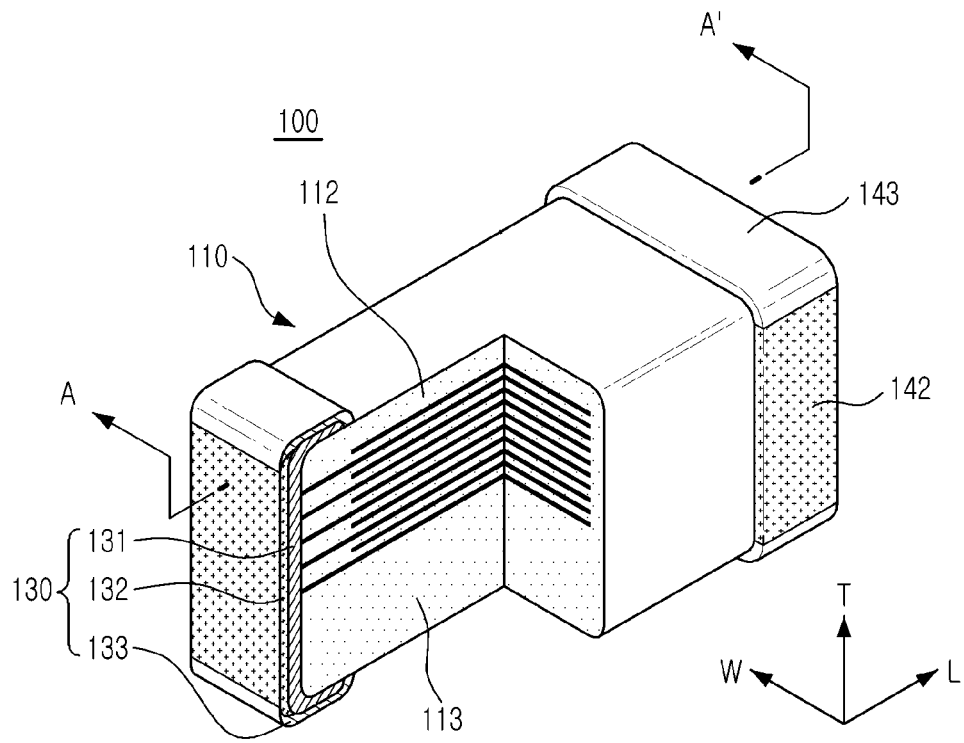
FIG. 1 is a partially cut-away perspective view schematically illustrating a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Hereinafter, a multilayer ceramic electronic part according to an exemplary embodiment of the present disclosure, for example, a multilayer ceramic capacitor will be described, but the present disclosure is not limited thereto.

Multilayer Ceramic Capacitor

Figure 2:
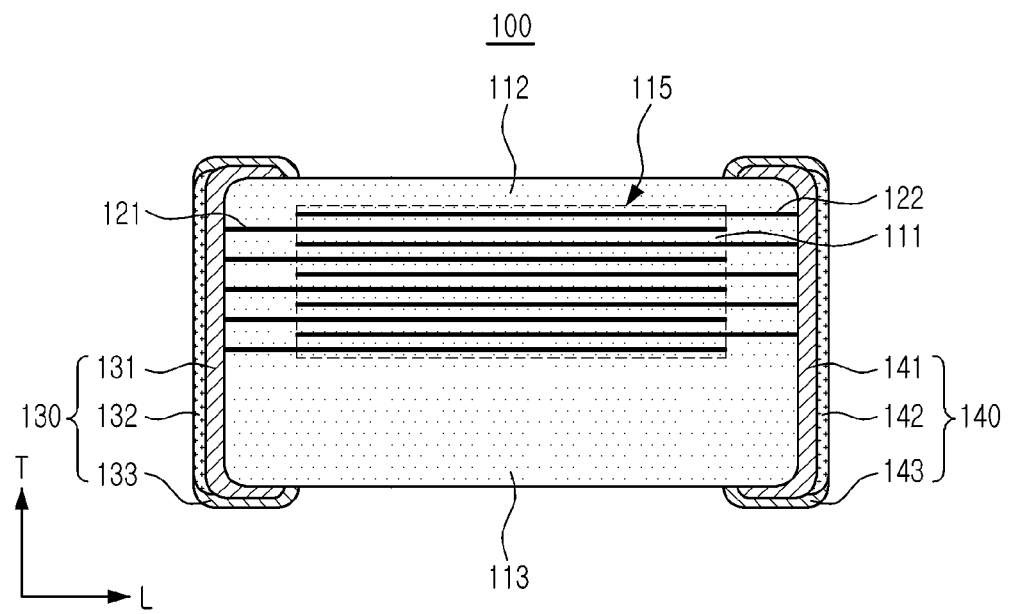
FIG. 2 is a cross-sectional view taken along line A-A' of FIG. 1.

FIG. 1 is a partially cut-away perspective view schematically illustrating a multilayer ceramic capacitor according to an exemplary embodiment of the present disclosure, and FIG. 2 is a cross-sectional view taken along line A-A' of FIG. 1.

Referring to FIGS. 1 and 2, the multilayer ceramic capacitor 100 according to an exemplary embodiment of the present disclosure may include a ceramic body 110, an active layer 115 including a plurality of first and second internal electrodes 121 and 122, upper and lower cover layers 112 and 113, and first and second external electrodes 130 and 140 electrically connected to the first and second internal electrodes 121 and 122, respectively.

The ceramic body 110 may be formed by stacking and then sintering a plurality of dielectric layers 111. In this case, a shape and a dimension of the ceramic body 110 and the number of stacked dielectric layers 111 are not limited to those of the exemplary embodiment shown in the accompanying drawings.

In addition, the plurality of dielectric layers 111 configuring the ceramic body 110 may be in a sintered state. Adjacent dielectric layers 111 may be integrated to be difficult to discern a boundary therebetween without using a scanning electron microscope (SEM).

In addition, the ceramic body 110 may have a hexahedral shape. Directions of a hexahedron will be defined to clearly describe exemplary embodiments of the present disclosure. L, W and T shown in FIG. 1 refer to a length direction, a width direction, and a thickness direction, respectively.

Further, in the exemplary embodiment of the present disclosure, both surfaces of the ceramic body 110, opposing each other, in the thickness direction thereof in which the dielectric layers 111 are stacked, may be defined as first and second main surfaces, both surfaces connecting the first and second main surfaces to each other and opposing each other in the length direction may be defined as first and second end surfaces, and both surfaces opposing each other in the width direction may be defined as first and second side surfaces.

This ceramic body 110 may include the active layer 115 as a part contributing to forming capacitance of the capacitor and the upper and lower cover layers 112 and 113 formed on and beneath the active layer 115, respectively, as upper and lower margin parts.

The active layer 115 may be formed by repeatedly stacking the plurality of first and second internal electrodes 121 and 122 so as to be alternately exposed to both end surfaces of the ceramic body 110 to have the dielectric layer 111 therebetween.

In this case, a thickness of the dielectric layer 111 may be optionally changed according to the capacitance design of the multilayer ceramic capacitor 100, but a thickness of a single layer may be 0.01 to 1.00 µm after sintering. However, the present disclosure is not limited thereto.

In addition, the dielectric layer 111 may contain a ceramic material having high permittivity, for example, barium titanate ($BaTiO_3$)-based ceramic powder, strontium titanate ($SrTiO_3$)-based ceramic powder, or the like, but is not limited thereto as long as sufficient capacitance may be obtained therefrom.

In addition, the dielectric layer 111 may further contain at least one of a ceramic additive, an organic solvent, a plasticizer, a binder, or a dispersant, in addition to the ceramic powder, as needed. The ceramic additive may include at least one of transition metal oxides or carbides, a rare earth element, magnesium (Mg), or aluminum (Al).

The upper and lower cover layers 112 and 113 may have the same material and configuration as those of the dielectric layer 111 except that internal electrodes are not included therein.

In addition, the upper and lower cover layers 112 and 113 may be formed by stacking one, or two or more dielectric layers on upper and lower surfaces of the active layer 115 in the thickness direction, respectively, and may generally serve to prevent the first and second internal electrodes 121 and 122 from being damaged by physical or chemical stress.

In this case, the lower cover layer 113 may have a thickness thicker than that of the upper cover layer 112 by increasing the number of stacked dielectric layers therein, as compared to that of the upper cover layer 112.

The first and second internal electrodes 121 and 122, electrodes having different polarities, may be formed by printing a conductive paste containing a conductive metal on the dielectric layer 111 to a predetermined thickness so as to be alternately exposed to the first and second end surfaces of the ceramic body 110 in the direction in which the dielectric layers 111 are stacked and may be electrically insulated from each other by the dielectric layer 111 disposed therebetween.

As the conductive metal, one of silver (Ag), palladium (Pd), platinum (Pt), nickel (Ni) or copper (Cu), or an alloy thereof or the like, may be used, but the present disclosure is not limited thereto. Further, as a printing method of the conductive paste, a screen printing method, a gravure printing method, or the like, may be used, but the present disclosure is not limited thereto.

Further, the first and second internal electrodes 121 and 122 may be electrically connected to the first and second external electrodes 130 and 140 through portions thereof alternately exposed to the first and second end surfaces of the ceramic body 110, respectively.

Therefore, when a voltage is applied to the first and second external electrodes 130 and 140, electric charges are accumulated between the first and second internal electrodes 121 and 122 facing each other. In this case, capacitance of the multilayer ceramic capacitor 100 may be in proportion to an area of an overlapped region between the first and second internal electrodes 121 and 122 in the active layer 115.

A thickness of the first and second internal electrodes 121 and 122 may be determined according to the use thereof. For example, the thickness of the first or second internal electrodes 121 or 122 may be determined in a range of 0.2 to 1.0 μm in consideration of a size of the ceramic body 110, but the present disclosure is not limited thereto.

The first and second external electrodes 130 and 140 may include first and second conductive layers 131 and 141 and first and second insulation layers 132 and 142, respectively.

The first and second conductive layers 131 and 141 may be extended from the first and second end surfaces of the ceramic body 110 onto portions of the first and second main surfaces thereof so as to cover the plurality of first and second internal electrodes 121 and 122 alternately exposed to the first and second end surfaces of the ceramic body 110 in a cross section of the ceramic body 110 in a thickness-width direction to thereby be electrically connected thereto.

In this case, the first and second conductive layers 131 and 141 may be formed using, for example, a copper-glass (Cu-glass) paste so as to provide high reliability such as excellent heat cycle resistance, moisture resistance, and the like, while having excellent electrical properties, but the present disclosure is not limited thereto.

The first and second insulation layers 132 and 142 may be formed on the first and second conductive layers 131 and 141 formed on the first and second end surfaces of the ceramic body 110, respectively. The first and second insulation layers 132 and 142 are provided to allow solder not to be formed or be significantly reduced in an amount thereof formed on a circumferential surface of the ceramic body except for a mounting surface of the first and second external electrodes 130 and 140, for example, the second main surface, at the time of mounting the multilayer ceramic capacitor 100 on a printed circuit board.

In addition, the first and second insulation layers 132 and 142 may be extended from the first and second end surfaces of the ceramic body 110 onto the first and second side surfaces thereof, as needed, to prevent the solder from being formed on the first and second side surfaces of the ceramic body 110.

Meanwhile, the first and second external electrodes 130 and 140 may further include first and second plating layers 133 and 143 formed to cover portions of the first and second conductive layers 131 and 141 disposed on the first and second main surfaces of the ceramic body, and edges of the first and second insulation layers 132 and 142.

In this case, the first and second plating layers 133 and 143 may include a nickel (Ni) plating layer formed to cover portions of the first and second conductive layers 131 and 141 disposed on the first and second main surfaces of the ceramic body, and the edges of the first and second insulation layers 132 and 142, and a tin (Sn) plating layer formed on the nickel plating layer.

The first and second plating layers 133 and 143 is to increase adhesion strength between the multilayer ceramic capacitor 100 and the printed circuit board at the time of mounting the multilayer ceramic capacitor 100 on the printed circuit board, or the like, by solder. The plating may be performed by a publicly disclosed method, and lead-free plating may be performed in consideration of eco-friendly factors, but the present disclosure is not limited thereto.

Hereinafter, a relationship between dimensions of components included in the multilayer ceramic capacitor according to the exemplary embodiment of the present disclosure and acoustic noise will be described.

Figure 3:
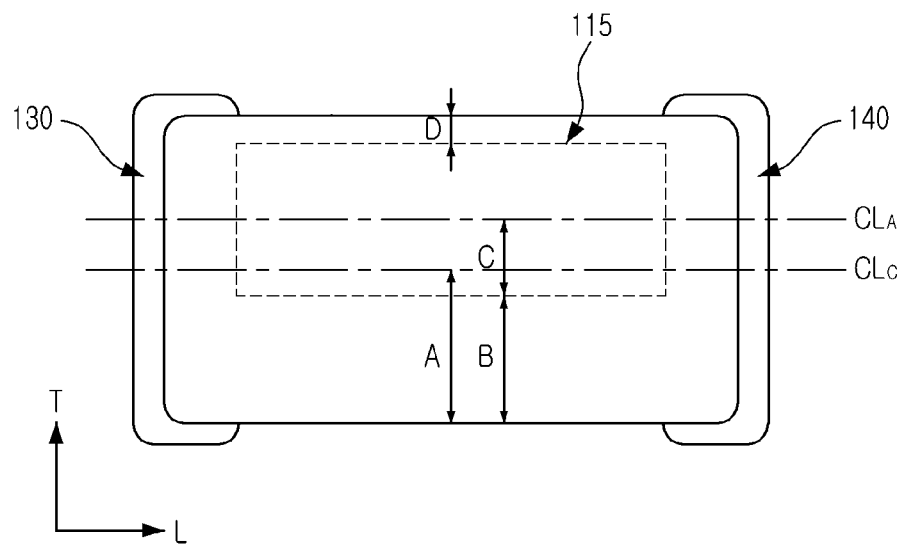
FIG. 3 is a schematic cross-sectional view of the multilayer ceramic capacitor of FIG. 1 taken in a length direction to describe a dimensional relationship between components included in the multilayer ceramic capacitor.

FIG. 3 is a schematic cross-sectional view of the multilayer ceramic capacitor of FIG. 1, taken in the length direction thereof, to describe a dimensional relationship between components included in the multilayer ceramic capacitor.

Referring to FIG. 3, a half of the entire thickness of the ceramic body 110 may be defined as A, a thickness of the lower cover layer 113 may be defined as B, a half of the entire thickness of the active layer 115 may be defined as C, and thickness of the upper cover layer 112 may be defined as D.

Here, the entire thickness of the ceramic body 110 may indicate a distance from the first main surface of the ceramic body 110 to the second main surface thereof, and the entire thickness of the active layer 115 may indicate a distance from an upper surface of a second internal electrode 122 formed in an uppermost portion of the active layer 115 to a lower surface of a first internal electrode 121 formed in a lowermost portion of the active layer 115.

In addition, the thickness B of the lower cover layer 113 may refer to a distance from the lower surface of the first internal electrode 121 formed in the lowermost portion of the active layer 115 in the thickness direction, to the second main surface of the ceramic body 110, and the thickness D of the upper cover layer 112 may refer to a distance from the upper surface of the second internal electrode 122 formed in the uppermost portion of the active layer 115 in the thickness direction, to the first main surface of the ceramic body 110.

When voltages having different polarities are applied to the first and second external electrodes 130 and 140 formed on the first and second end surfaces of the multilayer ceramic capacitor 100, the ceramic body 110 may expand and contract in the thickness direction due to an inverse piezoelectric effect in the dielectric layer 111, and both end surfaces of the ceramic body 110 may contract and expand in the contrary direction to expansion and contraction in the ceramic body 110 in the thickness direction, by a poisson effect.

Here, in both end portions of the ceramic body 110, a central portion of the active layer 115 in the thickness direction of the ceramic body may be a portion significantly expanded and contracted. Thus, in a case in which a solder is joined to this portion, since contraction and expansion behaviors of both end portions of the ceramic body 110 may be mostly transferred to the printed circuit board 210 through the solder, generation of acoustic noise may be significantly increased.

However, in the exemplary embodiment of the present disclosure, by using the first and second insulation layers 132 and 142, the solder may only be formed on a lower surface of the ceramic body 110 and in the vicinity thereof. The lower cover layer 113 may be formed to have a thickness thicker than that of the upper cover layer 112.

Therefore, points of inflection formed on both end surfaces of the ceramic body 110 are formed at a height equal to or lower than that of a central portion $CL_C$ of the ceramic body 110 in the thickness direction due to a difference between strain generated in the central portion $CL_A$ of the active layer 115 and strain generated in the lower cover layer 113 at the time of applying voltage thereto, acoustic noise may be decreased.

In this case, in order to further decrease acoustic noise, a ratio ((B+C)/A) of deviation of the central portion $CL_A$ of the active layer 115 from the central portion $CL_C$ of the ceramic body 110 may be in a range of 1.065 to 1.764 (1.065≤(B+C)/A≤1.764).

Further, a ratio (D/B) of the thickness D of the upper cover layer 112 to the thickness B of the lower cover layer 113 may be in a range of 0.021 to 0.409 (0.021≤D/B≤0.409).

In addition, in detail, a ratio (B/A) of the thickness B of the lower cover layer 113 to a half A of the thickness of the ceramic body 110 may be in a range of 0.331 to 1.537 (0.331≤B/A≤1.537).

Further, in further detail, a ratio (C/B) of a half C of the thickness of the active layer 115 to the thickness B of the lower cover layer 113 may be in a range of 0.148 to 2.441 (0.148≤C/B≤2.441).

Experimental Example

Multilayer ceramic capacitors according to Inventive Examples and Comparative Examples were manufactured as follows.

A plurality of ceramic green sheets having a thickness of several μm were manufactured by mixing a powder such as barium titanate ($BaTiO_3$) powder, or the like, a polymer, a solvent, and the like, to prepare a slurry, applying the prepared slurry to a carrier film using a doctor blade method, or the like, and drying the applied slurry.

The ceramic sheets were provided to form dielectric layers 111 of a ceramic body 110.

Then, a conductive paste for an internal electrode was applied to the ceramic green sheet so as to have a predetermined thickness, thereby forming first and second internal electrodes 121 and 122 to be alternately exposed to both end surfaces of the ceramic green sheet in a length direction.

As the method of applying the conductive paste, a screen printing method, a gravure printing method, or the like, may be used, but the present disclosure is not limited thereto.

Then, the plurality of ceramic green sheets were stacked so that the plurality of first and second internal electrodes 121 and 122 were disposed to face each other, having the ceramic sheet interposed therebetween, thereby forming a multilayer body.

In this case, ceramic green sheets on which the first and second internal electrodes 121 and 122 were not formed were stacked on and below the multilayer body, in a more stacked amount on the multilayer body than below the multilayer body.

Next, isostatic pressing was performed on the formed multilayer body at 85° C. and a pressure of about 1,000 kgf/cm².

Thereafter, the pressed multilayer body was cut into chips corresponding to respective single capacitors, and the cut chip was subjected to a de-binding process in which they were maintained at 230° C. for 60 hours under air atmosphere.

Then, the multilayer body was sintered at about 1200° C. under reduction atmosphere having oxygen partial pressure of $10^{-11}$ atm to $10^{-10}$ atm lower than Ni/NiO equilibrium oxygen partial pressure so that the first and second internal electrodes 121 and 122 were not oxidized, thereby preparing a ceramic body 110.

Next, first and second external electrodes 130 and 140 may be formed to be electrically connected to exposed portions of the first internal electrode 121 and the second internal electrode 122, respectively, as viewed in a cross-section of the ceramic body 110 in a thickness-width direction.

Hereinafter, a method of forming the first and second external electrodes 130 and 140 will be described in detail.

First, first and second conductive layers 131 and 141 may be formed using a conductive paste containing copper-glass, or the like, and may be extended from first and second end surfaces of the ceramic body 110 onto portions of first and second main surfaces thereof, so as to cover portions of the first and second internal electrodes 121 and 122 exposed to the first and second end surfaces of the ceramic body 110.

The conductive paste may be applied using a dipping method or various printing methods, but the present disclosure is not limited thereto. In addition, after an applying process, a heat treatment process may be performed, such that the applied conductive paste may be cured.

Then, first and second insulation layers 132 and 142 may be formed on the first and second conductive layers 131 and 141 disposed on the first and second end surfaces of the ceramic body, using an epoxy resist, or the like. In this case, the first and second insulation layers 132 and 142 may be formed to be extended from the first and second end surfaces of the ceramic body 110 onto the first and second side surfaces thereof.

The epoxy resist may be applied using a dipping method or various printing methods, but the present disclosure is not limited thereto. In addition, after an applying process, a heat treatment process may be performed, such that the epoxy resist may be cured.

Meanwhile, if necessary, after the forming of the first and second insulation layers 132 and 142, first and second plating layers 133 and 143 may be formed on the first and second main surfaces of the ceramic body by plating portions of the first and second conductive layers 131 and 141 corresponding thereto, and edges of the first and second insulation layers 132 and 142, using an electroplating method, or the like.

As a material used in the plating, nickel, tin, a nickel-tin alloy, or the like, may be used, but the present disclosure is not limited thereto.

In addition, if necessary, the first and second plating layers 133 and 143 may be formed sequentially forming a nickel (Ni) plating layer and a tin (Sn) plating layer on portions of the first and second conductive layers 131 and 141 disposed on the first and second main surfaces of the ceramic body and the edges of the first and second insulation layers 132 and 142.

The multilayer ceramic capacitor was manufactured by the manufacturing method in the above-mentioned Experimental Example. In this case, manufacturing tolerance was in a range of ±0.1 mm (Length×Width (L×W)), and experiments were performed on samples satisfying this range, such that acoustic noise was measured in respective samples.

TABLE 1

| Sample | A | B | C | D | (B + C)/A | B/A | D/B | C/B | Acoustic Noise (dB) | Capacitance Implementation Ratio |
|---|---|---|---|---|---|---|---|---|---|---|
| 1*  | 405.3 | 40.3  | 366.5 | 37.4  | 1.003 | 0.099 | 0.930  | 9.103  | 28.4 | OK |
| 2*  | 432.0 | 69.0  | 361.9 | 70.2  | 0.998 | 0.160 | 1.017  | 5.245  | 23.2 | OK |
| 3*  | 457.1 | 93.1  | 362.1 | 90.8  | 0.996 | 0.204 | 0.975  | 3.888  | 21.5 | OK |
| 4*  | 508.8 | 26.2  | 360.9 | 266.9 | 0.761 | 0.051 | 10.208 | 13.799 | 29.8 | OK |
| 5*  | 458.0 | 28.8  | 357.4 | 167.9 | 0.843 | 0.063 | 5.822  | 12.393 | 30.5 | OK |
| 6*  | 525.6 | 30.6  | 192.4 | 643.5 | 0.424 | 0.058 | 21.017 | 6.285  | 28.5 | OK |
| 7*  | 412.3 | 35.2  | 188.1 | 419.2 | 0.541 | 0.085 | 11.928 | 5.348  | 29.5 | OK |
| 8*  | 514.5 | 36.3  | 359.6 | 268.5 | 0.770 | 0.071 | 7.390  | 9.896  | 26.5 | OK |
| 9*  | 444.5 | 42.7  | 362.7 | 121.2 | 0.912 | 0.096 | 2.839  | 8.495  | 28.1 | OK |
| 10* | 468.0 | 41.1  | 363.4 | 167.8 | 0.864 | 0.088 | 4.080  | 8.839  | 26.5 | OK |
| 11* | 417.2 | 39.4  | 364.9 | 72.8  | 0.969 | 0.094 | 1.846  | 9.260  | 26.1 | OK |
| 12* | 426.8 | 44.0  | 361.5 | 94.6  | 0.950 | 0.103 | 2.151  | 8.220  | 25.9 | OK |
| 13* | 495.3 | 38.5  | 366.0 | 224.2 | 0.817 | 0.078 | 5.831  | 9.518  | 26.1 | OK |
| 14* | 433.7 | 24.7  | 420.9 | 2.4   | 1.028 | 0.057 | 0.098  | 17.053 | 30.1 | OK |
| 15* | 417.0 | 69.3  | 368.7 | 37.7  | 1.050 | 0.166 | 0.545  | 5.319  | 23.1 | OK |
| 16  | 432.5 | 95.6  | 365.1 | 39.1  | 1.065 | 0.221 | 0.409  | 3.819  | 18.1 | OK |
| 17  | 442.0 | 106.6 | 391.9 | 5.4   | 1.128 | 0.241 | 0.051  | 3.675  | 19.0 | OK |
| 18  | 443.1 | 118.3 | 363.0 | 42.0  | 1.086 | 0.267 | 0.355  | 3.069  | 18.1 | OK |
| 19  | 445.6 | 147.6 | 360.2 | 18.2  | 1.139 | 0.331 | 0.124  | 2.441  | 17.3 | OK |
| 20  | 453.5 | 164.3 | 354.2 | 21.1  | 1.143 | 0.362 | 0.128  | 2.156  | 17.0 | OK |
| 21  | 447.2 | 172.4 | 361.6 | 5.0   | 1.194 | 0.385 | 0.029  | 2.098  | 16.9 | OK |
| 22  | 472.7 | 175.8 | 362.7 | 40.2  | 1.139 | 0.372 | 0.229  | 2.064  | 16.8 | OK |
| 23  | 493.1 | 216.8 | 361.0 | 41.8  | 1.172 | 0.440 | 0.193  | 1.665  | 16.8 | OK |
| 24  | 501.8 | 270.4 | 357.5 | 12.1  | 1.251 | 0.539 | 0.045  | 1.322  | 16.7 | OK |
| 25  | 517.1 | 269.8 | 363.3 | 40.2  | 1.224 | 0.522 | 0.149  | 1.346  | 16.6 | OK |
| 26  | 500.9 | 366.8 | 314.1 | 16.0  | 1.359 | 0.732 | 0.044  | 0.856  | 16.6 | OK |
| 27  | 406.4 | 423.2 | 190.6 | 15.7  | 1.510 | 1.041 | 0.037  | 0.450  | 16.5 | OK |
| 28  | 446.2 | 494.7 | 177.6 | 40.0  | 1.507 | 1.109 | 0.081  | 0.359  | 16.4 | OK |
| 29  | 485.2 | 632.9 | 156.0 | 13.3  | 1.626 | 1.304 | 0.021  | 0.247  | 16.4 | OK |
| 30  | 522.7 | 645.0 | 189.0 | 15.6  | 1.596 | 1.234 | 0.024  | 0.293  | 16.4 | OK |
| 31  | 488.3 | 688.2 | 122.4 | 46.8  | 1.660 | 1.409 | 0.068  | 0.178  | 16.3 | OK |
| 32  | 507.8 | 742.1 | 119.9 | 29.5  | 1.698 | 1.461 | 0.040  | 0.162  | 16.3 | OK |
| 33  | 513.8 | 776.0 | 115.7 | 20.2  | 1.735 | 1.510 | 0.026  | 0.149  | 16.3 | OK |
| 34  | 522.5 | 803.0 | 118.7 | 18.1  | 1.764 | 1.537 | 0.023  | 0.148  | 16.3 | OK |
| 35* | 531.6 | 828.8 | 107.5 | 12.1  | 1.761 | 1.559 | 0.015  | 0.130  | 16.3 | NG |
| 36* | 533.8 | 843.1 | 106.3 | 13.3  | 1.778 | 1.579 | 0.016  | 0.126  | 16.3 | NG |
| 37* | 534.6 | 850.0 | 100.7 | 17.3  | 1.778 | 1.590 | 0.020  | 0.118  | 16.3 | NG |

Here, * indicates Comparative Example, and AN indicates acoustic noise.

Data of the Table 1 were obtained by measuring each dimension of a cross section from a photograph obtained by scanning a cross-section of the ceramic body 110 in the length-thickness (L-T) direction, taken along a central portion of the ceramic body 110 of the multilayer ceramic capacitor 100 in a width (W) direction using a scanning electron microscope (SEM) as shown in FIG. 3.

Here, a half of the entire thickness of the ceramic body 110 was defined as A, a thickness of the lower cover layer 113 was defined as B, a half of the entire thickness of the active layer 115 was defined C, and a thickness of the upper cover layer 112 was defined as D.

In order to measure acoustic noise, one sample (multilayer ceramic capacitor) per a board for measuring acoustic noise was mounted on a printed circuit board while upper and lower directions of the sample were differentiated from each other, and then the board was mounted on a measuring jig.

In addition, DC voltage and voltage variation were applied to both terminals of the sample mounted on the measuring jig using a DC power supply and a function generator. The acoustic noise was measured through a microphone installed directly above the printed circuit board.

In Table 1, samples 1 to 3 were Comparative Examples having a symmetrical cover structure in which the thickness B of the lower cover layer 113 and the thickness D of the upper cover layer 112 were almost similar to each other, and samples 4 to 13 were Comparative Examples having a structure in which the thickness D of the upper cover layer 112 was thicker than the thickness B of the lower cover layer 113.

Further, samples 14, 15 and 35 to 37 were Comparative Examples having a structure in which the thickness B of the lower cover layer 113 was thicker than the thickness D of the upper cover layer 112, and samples 16 to 34 were Inventive Examples according to an exemplary embodiment of the present disclosure.

Here, in the case in which (B+C)/A is almost 1, it indicates that the central portion of the active layer 115 does not largely deviate from the central portion of the ceramic body 110. In the samples 1 to 3 having the symmetrical cover structure in which the thickness B of the lower cover layer 113 and the thickness D of the upper cover layer 112 were almost similar to each other, (B+C)/A was almost 1.

(B+C)/A is larger than 1, it may refer to that the central portion of the active layer 115 deviates upwardly from the central portion of the ceramic body 110, and (B+C)/A is smaller than 1, it may refer to that the central portion of the active layer 115 deviates downwardly from the central portion of the ceramic body 110.

Referring to Table 1, it may be confirmed that in the samples 16 to 34, Inventive Examples in which the ratio ((B+C)/A) of deviation of the central portion of the active layer 115 from the central portion of the ceramic body 110 was in the range of 1.065 to 1.764 (1.065≤(B+C)/A≤1.764), the acoustic noise was significantly decreased to be less than 20 dB.

In addition, in the samples 1 to 15 in which the ratio ((B+C)/A) of deviation of the central portion of the active layer 115 from the central portion of the ceramic body 110 was less than 1.065, the samples had a structure in which there was little deviation of the central portion of the active layer 115 from the central portion of the ceramic body 110, or the central portion of the active layer 115 deviated downwardly from the central portion of the ceramic body 110.

In the samples 1 to 15 in which (B+C)/A was less than 1.065, the acoustic noise was 20 to 31 dB. Therefore, it may be appreciated that there was no effect of decreasing acoustic noise in these samples as compared to the Inventive Examples according to the exemplary embodiment of the present disclosure.

In addition, in the samples 35 to 37 in which the ratio ((B+C)/A) of the central portion of the active layer 115 deviating from the central portion of the ceramic body 110 was more than 1.764, a ratio of capacitance to the target capacitance was relatively low, such that a capacitance defect occurred.

In Table 1, the case in which a capacitance implementation ratio (that is, a ratio of capacitance to the target capacitance) was indicated as "NG" refers to the case in which the ratio of the capacitance to the target capacitance was less than 80% when the target capacitance value was considered as 100%.

Further, it may be appreciated that in Inventive Examples in which the ratio (D/B) of the thickness D of the upper cover layer 112 to the thickness B of the lower cover layer 113 was in the range of 0.021 to 0.409 (0.021≤D/B≤0.409), the acoustic noise was significantly decreased.

On the other hand, it may be appreciated that in Comparative Examples in which the ratio (D/B) of the thickness D of the upper cover layer 112 to the thickness B of the lower cover layer 113 was more than 0.409, acoustic noise was not decreased.

In the case in which the ratio (D/B) of the thickness D of the upper cover layer 112 to the thickness B of the lower cover layer 113 was less than 0.021, the thickness B of the lower cover layer 113 was excessively thick as compared to the thickness D of the upper cover layer 112, such that cracks or delamination may occur. In addition, the capacitance was excessively low as compared to the target capacitance, such that a capacitance defect may occur.

Meanwhile, it may be appreciated that acoustic noise is further decreased to be less than 18 dB in the samples 19 to 34, Inventive Examples in which a ratio (B/A) of the thickness B of the lower cover layer 113 to a half A of the thickness of the ceramic body 110 and a ratio (C/B) of a half C of the thickness of the active layer 115 to the thickness B of the lower cover layer 113 were in a range of 0.331 to 1.537 and in a range of 0.148 to 2.441, respectively (0.331≤B/A≤1.537 and 0.148≤C/B≤2.441).

On the other hand, in the samples 35 to 37 in which the ratio (B/A) of the thickness B of the lower cover layer 113 to a half A of the thickness of the ceramic body 110 was more than 1.537, or the ratio (C/B) of a half C of the thickness of the active layer 115 to the thickness B of the lower cover layer 113 was less than 0.148, the capacitance is relatively low as compared to the target capacitance, such that a capacitance defect may occur.

Board Having Multilayer Ceramic Capacitor Mounted Thereon

Figure 4:
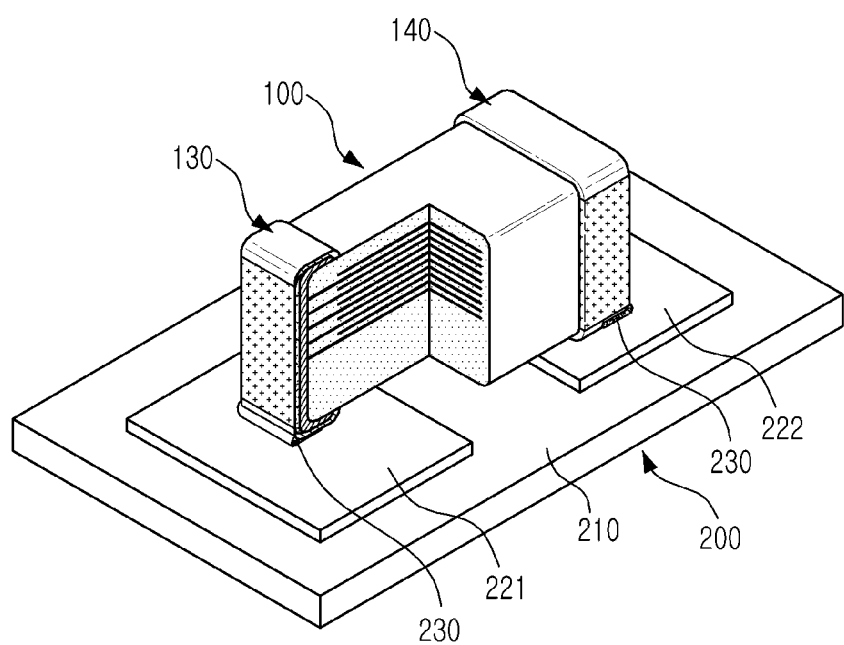
FIG. 4 is a partially cut-away perspective view schematically illustrating a form in which the multilayer ceramic capacitor of FIG. 1 is mounted on a printed circuit board.
Figure 5:
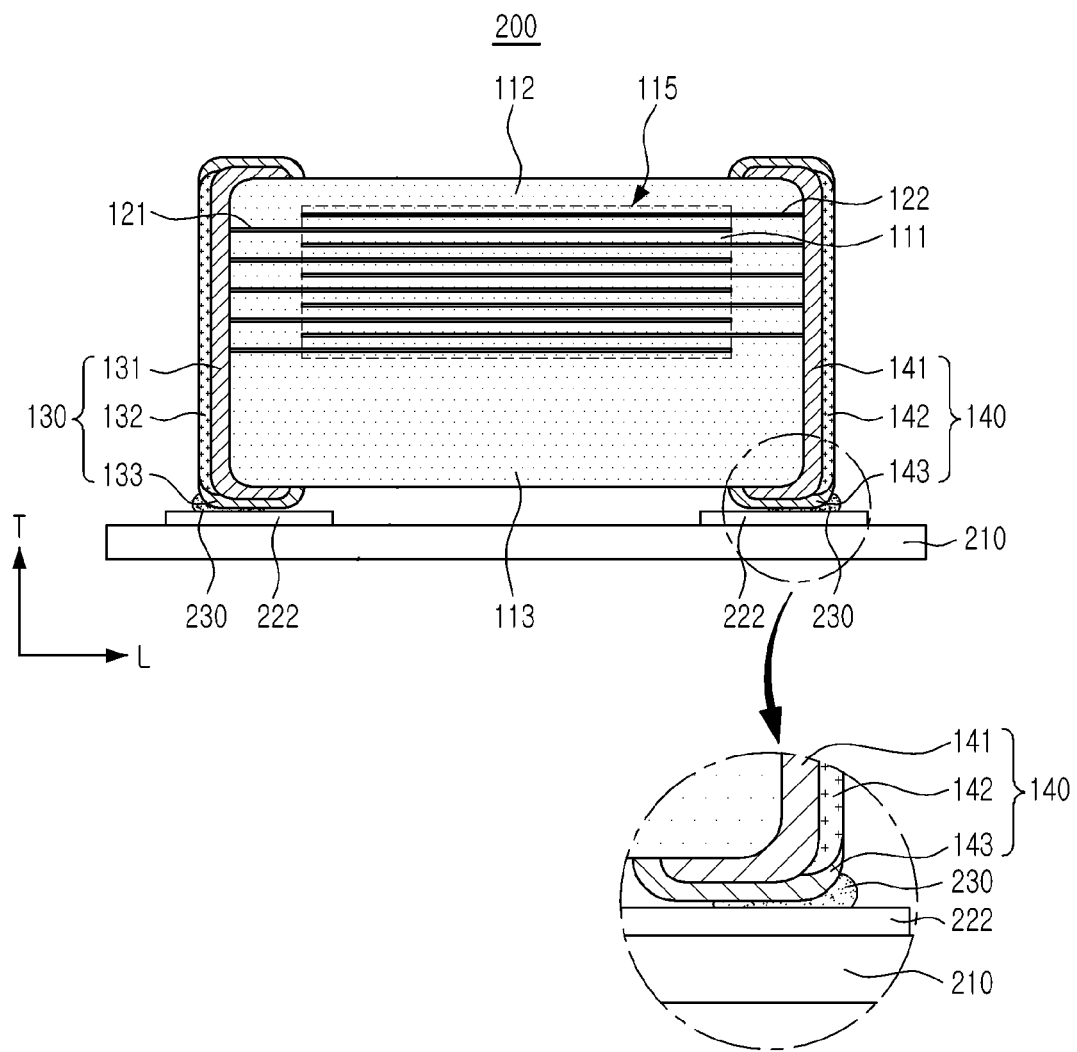
FIG. 5 is a cross-sectional view of the multilayer ceramic capacitor and the printed circuit board of FIG. 4 taken in the length direction.

FIG. 4 is a partially cut-away perspective view schematically illustrating a form in which the multilayer ceramic capacitor of FIG. 1 is mounted on a printed circuit board, and FIG. 5 is a cross-sectional view of the multilayer ceramic capacitor and the printed circuit board of FIG. 4 taken in the length direction.

Referring to FIGS. 4 and 5, a board 200 having a multilayer ceramic capacitor 100 mounted thereon according to the exemplary embodiment of the present disclosure may include a printed circuit board 210 on which the multilayer ceramic capacitor 100 is mounted and first and second electrode pads 221 and 222 formed on the printed circuit board 210 to be spaced apart from each other.

In addition, the multilayer ceramic capacitor 100 may be mounted so that a first or second main surface of a ceramic body on which first and second insulation layers 132 and 142 are not formed, but to which first and second conductive layers 131 and 141 are exposed, in the first and second external electrodes 130 and 140, faces the printed circuit board 210.

Further, the multilayer ceramic capacitor 100 may be electrically connected to the printed circuit board 210 by a solder 230 in a state in which the lower cover layer 113 is located on a lower part thereof and first and second plating layers 133 and 143 respectively formed on the first and second conductive layers 131 and 141 are positioned on the first and second electrode pads 221 and 222 to contact each other, respectively.

When a voltage is applied in a state in which the multilayer ceramic capacitor 100 is mounted on the printed circuit board 210, acoustic noise may be generated.

Here, sizes of the first and second electrode pads 221 and 222 may be an index for determining the amount of the solder 230 connecting the first and second external electrodes 130 and 140 of the multilayer ceramic capacitor 100 to the first and second electrode pads 221 and 222, and the level of the acoustic noise may be adjusted according to the amount of the solder 230.

In the exemplary embodiment of the present disclosure, since the solder 230 is only formed on the first or second main surface of the ceramic body 110 and in the vicinity thereof by forming the first and second insulation layers 132 and 142 on the first and second end surfaces of the ceramic body 110 to be extended to the first and second side surfaces thereof, an amount of the solder 230 may be decreased, such that the level of acoustic noise may be decreased.

Figure 6:
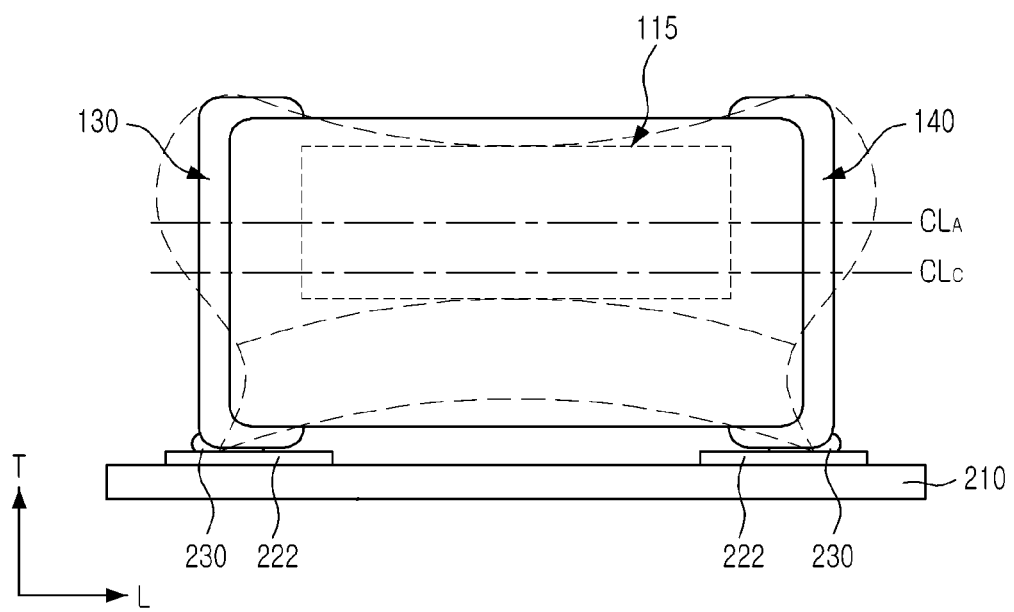
FIG. 6 is a cross-sectional view schematically illustrating a form in which the multilayer ceramic capacitor of FIG. 4 is deformed by a voltage applied thereto in a state of being mounted on the printed circuit board.

FIG. 6 is a cross-sectional view schematically illustrating a form in which the multilayer ceramic capacitor of FIG. 4 is deformed when a voltage is applied thereto in a state in which the multilayer ceramic capacitor is mounted on the printed circuit board.

Referring to FIG. 6, when voltages having different polarities are applied to the first and second external electrodes 130 and 140 of the multilayer ceramic capacitor 100 in a state in which the multilayer ceramic capacitor 100 is mounted on the printed circuit board 210, the ceramic body 110 may expand and contract in the thickness direction due to an inverse piezoelectric effect in the dielectric layer 111, and both end surfaces of the ceramic body 110 on which the first and second external electrodes 130 and 140 are formed may contract and expand in the contrary direction to expansion and contraction of the ceramic body 110 in the thickness direction, by a poisson effect.

Here, in both end portions of the ceramic body 110, a central portion of the active layer 115 in the thickness direction of the ceramic body may be a portion significantly expanded and contracted. Thus, in a case in which a solder is joined to this portion, since contraction and expansion behaviors of both end portions of the ceramic body 110 may be mostly transferred to the printed circuit board 210 through the solder, generation of acoustic noise may be significantly increased.

However, according to the exemplary embodiment of the present disclosure, the mounting surface of the first and second external electrodes 130 and 140 may be a surface on which displacement of the ceramic body 110 is relatively small and vibrations may not be effectively transferred, that is, the first or second main surface.

Therefore, in the case in which points of inflection formed on both end surfaces of the ceramic body 110 are formed at a height equal to or lower than that of the solder 230 due to a difference between strain generated in the central portion $CL_A$ of the active layer 115 and strain generated in the lower cover layer 113 at the time of the application of voltage, the acoustic noise may be decreased.

In addition, since the solder 230 may not be formed on the first and second end surfaces and the first and second side surfaces except for the mounting surface of the first and second external electrodes 130 and 140 by the first and second insulation layers 132 and 142, a height of the solder 230 may be significantly decreased.

A volume of the solder 230 formed on circumferential surfaces of the first and second external electrodes 130 and 140 is decreased, such that acoustic noise transferred through the first and second external electrodes 130 and 140 and the solder 230 may be decreased, and even in a case in which a plurality of multilayer ceramic capacitors 100 are mounted with a narrow pitch, for example, highly densely mounted on the printed circuit board 210, a solder bridge between the multilayer ceramic capacitors 100 may not be formed, thereby improving component reliability.

According to exemplary embodiments of the present disclosure, the lower cover layer has a thickness thicker than that of the upper cover layer, and a non-conductive insulation layer is formed on both end surfaces and both side surfaces of the ceramic body, except for the mounting surface of the external electrode, to decrease the height of the solder formed on the circumferential surface of the external electrode at the time of mounting the multilayer ceramic electronic part on the printed circuit board, such that vibrations generated in the multilayer ceramic electronic part and transferred to the printed circuit board through the external electrode and the solder may be decreased, thereby decreasing acoustic noise.

In addition, the volume of the solder formed on the circumferential surface of the external electrode is decreased, such that even in the case of mounting the plurality of multilayer ceramic electronic parts on the printed circuit board with a narrow pitch, a solder bridge between multilayer ceramic electronic parts is not formed, thereby improving component reliability.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic part comprising:
   a ceramic body including a plurality of dielectric layers;
   an active layer including a plurality of first and second internal electrodes disposed in the ceramic body and disposed to be alternately exposed to end surfaces of the ceramic body, the dielectric layers being interposed between the first and second internal electrodes;
   an upper cover layer disposed on an upper portion of the active layer;
   a lower cover layer disposed on a lower portion of the active layer and having a thickness greater than that of the upper cover layer; and
   first and second external electrodes electrically connected to the first and second internal electrodes,
   wherein the first and second external electrodes include:
   first and second conductive layers extended from the end surfaces of the ceramic body onto upper and lower main surfaces thereof; and
   first and second insulation layers disposed on the first and second conductive layers disposed on the end surfaces of the ceramic body, and
   wherein the first and second external electrodes further comprise first and second plating layers formed to cover portions of the first and second conductive layers disposed on upper and lower main surfaces of the ceramic body and edges of the first and second insulation layers.

2. The multilayer ceramic electronic part of claim 1, wherein the first and second conductive layers are extended from both end surfaces of the ceramic body onto both side surfaces thereof, and
   the first and second insulation layers are extended from the first and second conductive layers disposed on both end surfaces of the ceramic body onto both side surfaces thereof.

3. A board having a multilayer ceramic electronic part mounted thereon, the board comprising:
   a printed circuit board having first and second electrode pads disposed thereon; and
   the multilayer ceramic electronic part of claim 2, mounted on the first and second electrode pads.

4. The multilayer ceramic electronic part of claim 1, wherein the first and second plating layers include:
   a nickel (Ni) plating layer formed to cover portions of the first and second conductive layers disposed on the upper and lower main surfaces of the ceramic body and the edges of the first and second insulation layers; and
   a tin (Sn) plating layer formed on the nickel plating layer.

5. A board having a multilayer ceramic electronic part mounted thereon, the board comprising:
   a printed circuit board having first and second electrode pads disposed thereon; and
   the multilayer ceramic electronic part of claim 4, mounted on the first and second electrode pads.

6. The multilayer ceramic electronic part of claim 1, wherein the first and second insulation layers are formed of an epoxy resist.

7. A board having a multilayer ceramic electronic part mounted thereon, the board comprising:
   a printed circuit board having first and second electrode pads disposed thereon; and
   the multilayer ceramic electronic part of claim 6, mounted on the first and second electrode pads.

8. The multilayer ceramic electronic part of claim 1, wherein when a half of the entire thickness of the ceramic body is defined as A, a thickness of the lower cover layer is defined as B, a half of the entire thickness of the active layer is defined as C, and a thickness of the upper cover layer is defined as D, a ratio ((B+C)/A) of deviation of a central portion of the active layer from a central portion of the ceramic body is in the range of 1.065 to 1.764 ($1.065 \leq (B+C)/A \leq 1.764$).

9. A board having a multilayer ceramic electronic part mounted thereon, the board comprising:
   a printed circuit board having first and second electrode pads disposed thereon; and
   the multilayer ceramic electronic part of claim 8, mounted on the first and second electrode pads.

10. The multilayer ceramic electronic part of claim 1, wherein a ratio (D/B) of a thickness D of the upper cover layer to a thickness B of the lower cover layer is in a range of 0.021 to 0.409 ($0.021 \leq D/B \leq 0.409$).

11. A board having a multilayer ceramic electronic part mounted thereon, the board comprising:
- a printed circuit board having first and second electrode pads disposed thereon; and
- the multilayer ceramic electronic part of claim 10, mounted on the first and second electrode pads.

12. The multilayer ceramic electronic part of claim 1, wherein a ratio (B/A) of a thickness B of the lower cover layer to a half A of the entire thickness of the ceramic body is in a range of 0.331 to 1.537 (0.331≤B/A≤1.537).

13. A board having a multilayer ceramic electronic part mounted thereon, the board comprising:
- a printed circuit board having first and second electrode pads disposed thereon; and
- the multilayer ceramic electronic part of claim 12, mounted on the first and second electrode pads.

14. The multilayer ceramic electronic part of claim 1, wherein a ratio (C/B) of a half C of the entire thickness of the active layer to a thickness B of the lower cover layer is in a range of 0.148 to 2.441 (0.148≤C/B≤2.441).

15. A board having a multilayer ceramic electronic part mounted thereon, the board comprising:
- a printed circuit board having first and second electrode pads disposed thereon; and
- the multilayer ceramic electronic part of claim 14, mounted on the first and second electrode pads.

16. A board having a multilayer ceramic electronic part mounted thereon, the board comprising:
- a printed circuit board having first and second electrode pads disposed thereon; and
- the multilayer ceramic electronic part of claim 1, mounted on the first and second electrode pads.

17. A multilayer ceramic electronic part comprising:
a ceramic body including a plurality of dielectric layers;
an active layer including a plurality of first and second internal electrodes disposed in the ceramic body and disposed to be alternately exposed to end surfaces of the ceramic body, the dielectric layers being interposed between the first and second internal electrodes;
an upper cover layer disposed on an upper portion of the active layer;
a lower cover layer disposed on a lower portion of the active layer and having a thickness greater than that of the upper cover layer; and
first and second external electrodes electrically connected to the first and second internal electrodes,
wherein the first and second external electrodes include:
first and second conductive layers extended from the end surfaces of the ceramic body onto upper and lower main surfaces thereof; and
first and second insulation layers disposed on the first and second conductive layers disposed on the end surfaces of the ceramic body, and
wherein points of inflection formed on both end surfaces of the ceramic body are formed at a height equal to or lower than that of a central portion of the ceramic body in a thickness direction due to a difference between strain generated in the central portion of the active layer and strain generated in the lower cover layer at the time of the application of voltage.

18. A board having a multilayer ceramic electronic part mounted thereon, the board comprising:
- a printed circuit board having first and second electrode pads disposed thereon; and
- the multilayer ceramic electronic part of claim 17, mounted on the first and second electrode pads.

19. A manufacturing method of a multilayer ceramic electronic part, the manufacturing method comprising:
preparing a multilayer body by stacking and pressing a plurality of ceramic sheets on which first and second internal electrodes are formed to face each other, the ceramic sheet being interposed between the first and second internal electrodes;
preparing a ceramic body by cutting the multilayer body into regions corresponding to respective single capacitors and sintering the cut multilayer body; and
forming first and second external electrodes on the ceramic body so as to be electrically connected to the first and second internal electrodes,
wherein the forming of the first and second external electrodes includes:
forming first and second conductive layers from end surfaces of the ceramic body to upper and lower main surfaces thereof using a conductive paste containing copper-glass;
forming first and second insulation layers to cover the first and second conductive layers disposed on the end surfaces of the ceramic body, using an epoxy resist; and
forming first and second plating layers by plating portions of the first and second conductive layers disposed on the upper and lower main surfaces of the ceramic body and the edges of the first and second insulation layers.

20. The manufacturing method of claim 19, wherein in the forming of the first and second external electrodes,
the first and second conductive layers are extended from both end surfaces of the ceramic body onto both side surfaces of the ceramic body, and
the first and second insulation layers are extended from the first and second conductive layers disposed on both end surfaces of the ceramic body onto both side surfaces thereof.

21. The manufacturing method of claim 19, wherein the forming of the first and second plating layers comprises:
forming a nickel (Ni) plating layer to cover portions of the first and second conductive layers disposed on the upper and lower main surfaces of the ceramic body and edges of the first and second insulation layers; and
forming a tin (Sn) plating layer on the nickel plating layer.

\* \* \* \* \*